United States Patent
Galt et al.

(10) Patent No.: US 6,171,092 B1
(45) Date of Patent: Jan. 9, 2001

(54) PLATEN SENSING AND ALIGNMENT APPARATUS

(75) Inventors: John Galt, Nobelton; Martin Kestle, Everett, both of (CA)

(73) Assignee: Husky Injection Molding Systems Ltd. (CA)

(*) Notice: Under 35 U.S.C. 154(b), the term of this patent shall be extended for 0 days.

(21) Appl. No.: 09/165,283

(22) Filed: Oct. 2, 1998

(51) Int. Cl.$^7$ .................................................. B29C 45/80
(52) U.S. Cl. ........................ 425/138; 425/150; 425/169; 264/40.5; 100/46; 100/99; 100/258 A
(58) Field of Search ................................... 425/138, 150, 425/169, 589, 595; 100/46, 99, 258 A; 324/207.13, 40.5; 264/40.05

(56) References Cited

U.S. PATENT DOCUMENTS

| | | | |
|---|---|---|---|
| 5,196,150 | * 3/1993 | Mimura et al. | 264/40.5 |
| 5,629,030 | * 5/1997 | Beringer et al. | 425/135 |
| 5,792,396 | * 8/1998 | Takizawa | 264/40.5 |
| 5,856,875 | * 1/1999 | Duey et al. | 356/400 |

* cited by examiner

Primary Examiner—Tim Heitbrink
Assistant Examiner—Donald Heckenberg

(74) Attorney, Agent, or Firm—Fitzpatrick, Cella, Harper & Scinto

(57) ABSTRACT

An apparatus and method for detecting whether platens in a mold clamp remain parallel throughout an entire molding process. The apparatus includes a frame, a first platen having a surface orthogonal to a predetermined axis, a second platen having a surface opposing the first platen, the second platen being reciprocatable along the predetermined axis, actuating cylinders for reciprocating the second platen along the predetermined axis, and positions transducers for electromagnetically detecting the positions of a plurality of points on the surface of the second platen. The method includes the steps of emitting first and second electromagnetic interrogation pulses from a controller, transmitting the first pulse to a first transducer rod fixed relative to the first platen, and transmitting the second pulse to a second transducer rod fixed relative to the first platen and parallel to the first transducer rod, generating a first return signal when the first pulse reaches a magnet disposed adjacent to the first transducer rod and fixed relative to one end of the second platen, and generating a second return signal when the second pulse reaches a magnet disposed adjacent to the second transducer and fixed relative to an opposite end of the second platen, transmitting each of the first and second return signals to the controller, measuring the time elapsed between the emission of each pulse and the arrival of the corresponding return signal at the controller, and determining, based on the times elapsed, whether the opposing surfaces of the second platen and the first platen are substantially parallel.

38 Claims, 9 Drawing Sheets

PLATEN SENSING AND ALIGNMENT APPARATUS

BACKGROUND OF THE INVENTION

1. Field of the Invention

The present invention relates to an apparatus and method for maintaining proper alignment between platens of a mold clamp for a molding machine and, more particularly, to the use of electromagnetic sensors to detect misalignment of the platens at all stages of the molding process.

2. Description of the Related Art

Very large molding machines use platens which, if misaligned when moving, can cause substantial mechanical damage to the machine or the mold installed in it. The problem of maintaining platen parallelism or "leveling" during clamping operations for processes like stamping metals, compression molding, or injection molding is well-known.

U.S. Pat. No. 3,640,660 issued to De Mets (incorporated herein by reference) discloses a vertical press with a means for measuring the relative distance between its two pressure platens when the platens are in a closed operative position. U.S. Pat. No. 5,196,150 issued to Mimura, et al. (incorporated herein by reference) discloses another vertical press in which the stroke deviation for the compression can be adjusted by detecting the position of the moving platen during the compression stroke so that levelness of the moving die can be maintained during the compression stroke. U.S. Pat. No. 5,314,327 issued to Stein and U.S. Pat. No. 5,454,709 issued to Leonhartsberger, et al. (both incorporated herein by reference) disclose a horizontal clamp with a moving platen having adjustable means for maintaining parallelism between the platens. These means are mechanical and need to be manually adjusted. Neither of these patents discloses means for sensing lack of parallelism automatically.

None of the above-referenced patents teach how misalignment of platens can be detected at any point over the entire operating stroke of the moving platen. The prior art teaches how misalignment can be detected and corrected only after the moving platen has closed and is being subjected to molding pressure, which subsequently causes the misalignment.

Causes of misalignment other than molding pressure, however, can cause the moving platen to become misaligned prior to the time the platens are closed. For example, a molded part may not eject properly from the mold and thus become trapped between the two mold halves as the moving platen closes the mold. If this entrapment is on one side of the mold only, a significant out of balance force will be applied to the moving platen causing it to cock or become seriously misaligned while still moving.

Another cause of misalignment could be the malfunction of a robot or part removal system in such a way that the robot or part of its tooling does not clear out of the path of the moving platen or the mold attached thereto. Collision between the robot or part of its tooling and the moving platen or mold could cause a misalignment that would go undetected in prior art devices.

Accordingly, there is a need in the art for a way to detect misalignment during the operating stroke of the moving platen, and promptly correcting such misalignment as soon as it is detected and before any damage is caused.

SUMMARY OF THE INVENTION

It is an object of the present invention to provide method and apparatus for detecting misalignment of platens during the clamping and molding process.

According to one aspect of the present invention, a clamp apparatus includes a frame, a first platen having a surface orthogonal to a predetermined axis, and a second platen having a surface opposing the first platen. The second platen is reciprocatable along the predetermined axis, and means are provided for reciprocating the second platen along the predetermined axis. Means also are provided for electromagnetically detecting the positions of a plurality of points on the surface of the second platen.

According to another aspect of the present invention, a mold clamp for a molding machine includes a frame, a first platen mounted on the frame having a surface with first and second opposite edges, and a second platen movable toward and away from the first platen having a surface facing the surface of the first platen with first and second opposite edges corresponding to the first and second opposite edges of the surface of the first platen. An actuating mechanism is provided for moving the second platen toward and away from the first platen, and a plurality of sensors are provided for electromagnetically detecting the respective positions of the first and second opposite edges of the second platen.

According to a further aspect of the present invention, a mold clamp for a molding machine includes a frame having a central alignment beam, a first platen mounted on the frame and disposed perpendicular to the central alignment beam, a second platen bearing on the central alignment beam, and a plurality of actuating cylinders for reciprocating the second platen along the central alignment beam. A plurality of transducer rods are mounted on the frame on opposite sides of the central alignment beam and extend parallel to the central alignment beam, and a plurality of magnets are mounted on the second platen, each of which is disposed about a transducer rod. A controller is provided for receiving a plurality of signals indicating the position of each magnet along a respective transducer rod, and determining based on the signals whether the second platen is substantially parallel to the first platen.

According to yet another aspect of the present invention, a method of determining whether a second platen is parallel to a first platen in a molding process includes the steps of: (1) emitting first and second electromagnetic interrogation pulses from a controller, (2) transmitting the first pulse to a first transducer rod fixed relative to the first platen, and transmitting the second pulse to a second transducer rod fixed relative to the first platen and parallel to the first transducer rod, (3) generating a first return signal when the first pulse reaches a magnet disposed adjacent to the first transducer rod and fixed relative to one end of the second platen, and generating a second return signal when the second pulse reaches a magnet disposed adjacent to the second transducer and fixed relative to an opposite end of the second platen, (4) transmitting each of the first and second return signals to the controller, (5) measuring the time elapsed between the emission of each pulse and the arrival of the corresponding return signal at the controller, and (6) determining, based on the times elapsed, whether opposing surfaces of the second platen and the first platen are substantially parallel.

According to still a further aspect of the present invention, a mold clamp for a molding machine includes a frame, a first platen fixed relative to the frame, and a second platen reciprocatable along a predetermined axis which lies perpendicular to the first platen and having a surface opposing a surface of the first platen. An actuating mechanism is provided for reciprocating the second platen along the predetermined axis, and a plurality of sensors are provided for electromagnetically detecting the positions of at least three points on the surface of the second platen.

According to another aspect of the present invention, a clamp apparatus includes a frame, a first platen fixed relative to the frame, a second platen movable along a predetermined axis, and an actuating mechanism for moving the second platen along the predetermined axis. An electromagnetic sensor device is provided for detecting whether opposing surfaces of the second platen and the first platen are substantially parallel.

According to a further aspect of the present invention, a clamp apparatus includes a frame, a first platen mounted to the frame, a second platen bearing on the frame and movable toward and away from the first platen, and an actuating mechanism for moving the second platen toward and away from the first platen. A sensor system is provided for detecting whether opposing surfaces of the second platen and the first platen are substantially parallel during movement of the second platen.

Yet another aspect of the present invention includes a control apparatus for use with a mold clamp for a molding machine. The molding machine includes a frame, a first platen, a second platen, and an actuating mechanism for moving the second platen toward and away from the first platen. The control apparatus includes a sensor device for determining whether opposing surfaces of the first and second platens are substantially parallel during movement of the second platen toward or away from the first platen.

According to a further aspect of the present invention, an injection molding machine includes a machine frame, a first platen, a second platen, and means for moving the second platen between an open and a closed position. A first mold half is fastened to the first platen and a second mold half is fastened to the second platen in a manner such that when the second platen is moved to the closed position, the first and second mold halves together form a mold cavity. Means are provided for injecting molten resin into the mold cavity formed by the first and second mold halves, and means are also provided for detecting whether the first platen is substantially parallel to the second platen during movement of the second platen between the open and closed positions.

These and other objects, features, and advantages can be better appreciated with reference to the following drawings, in which like reference numerals refer to like elements throughout.

BRIEF DESCRIPTION OF THE DRAWINGS

The present invention is described in conjunction with the accompanying drawings, in which.

DETAILED DESCRIPTION OF THE PREFERRED EMBODIMENTS

The advantageous features of the present invention will be described below with respect to a large tonnage clamp, which, in a preferred embodiment, is used in conjunction with an injection molding machine. Also within the scope of the present invention, however, are other applications for which a clamp could be adapted, such as, but not limited to, compression molding or metal stamping.

Figure 3:
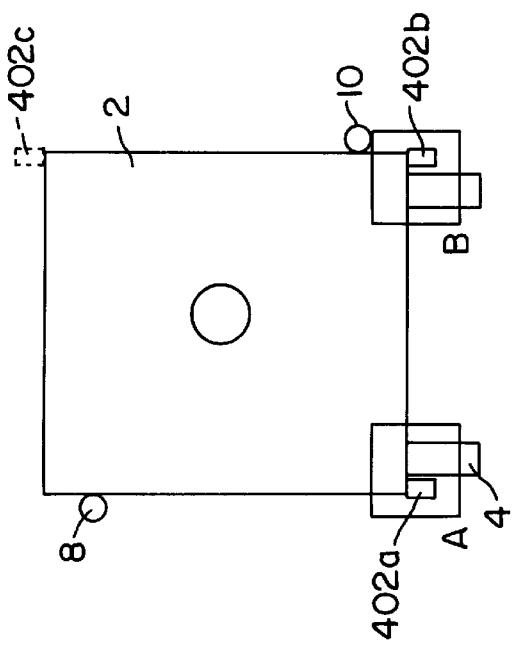
FIG. 3 is an end view of the large tonnage clamp shown in FIGS. 1 and 2.
Figure 1:
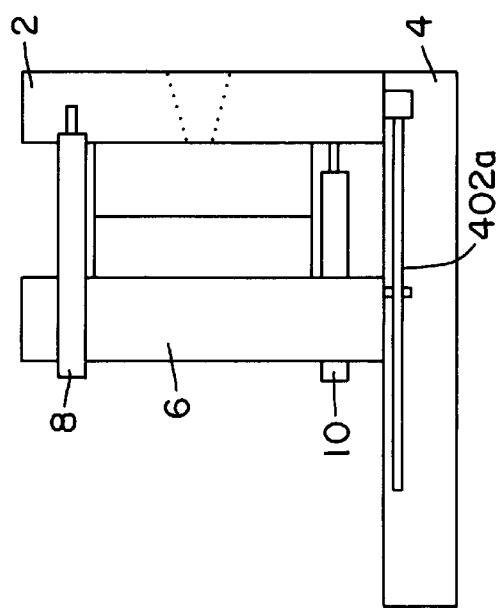
FIG. 1 is a side view of a large tonnage clamp in the closed position.
Figure 2:
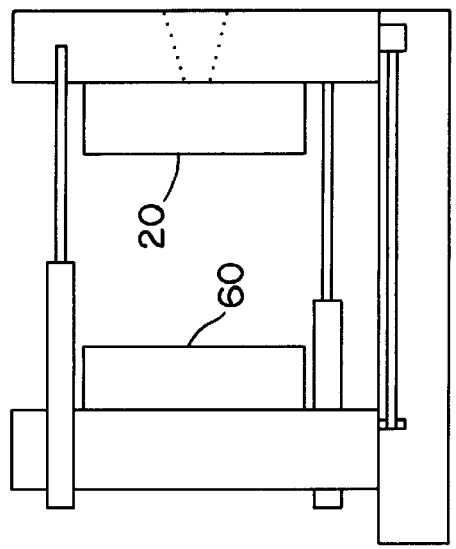
FIG. 2 is a side view of a large tonnage clamp in the open position.

FIGS. 1 through 3 show a typical large tonnage clamp that has been modified in accordance with the present invention. A stationary platen 2 is fixed to frame 4 on which slides a moving platen 6, actuated by two diagonally mounted cylinders 8 and 10. The stationary platen 2 and the moving platen 6 have opposing surfaces 20 and 60 respectively on which mold halves (not shown) can be attached. In a preferred embodiment, the clamp exerts 8000 metric tonnes of clamping force on the mold, the stationary platen weighs 175 metric tonnes, and the moving platen weighs 207 metric tonnes. The platens are 5.2 meters (17 feet) wide and over 4.5 meters (14 feet) high. In the embodiment shown, the maximum speed of platen opening and closing is 500 millimeters/second (19.7 inches/second).

Figure 4:
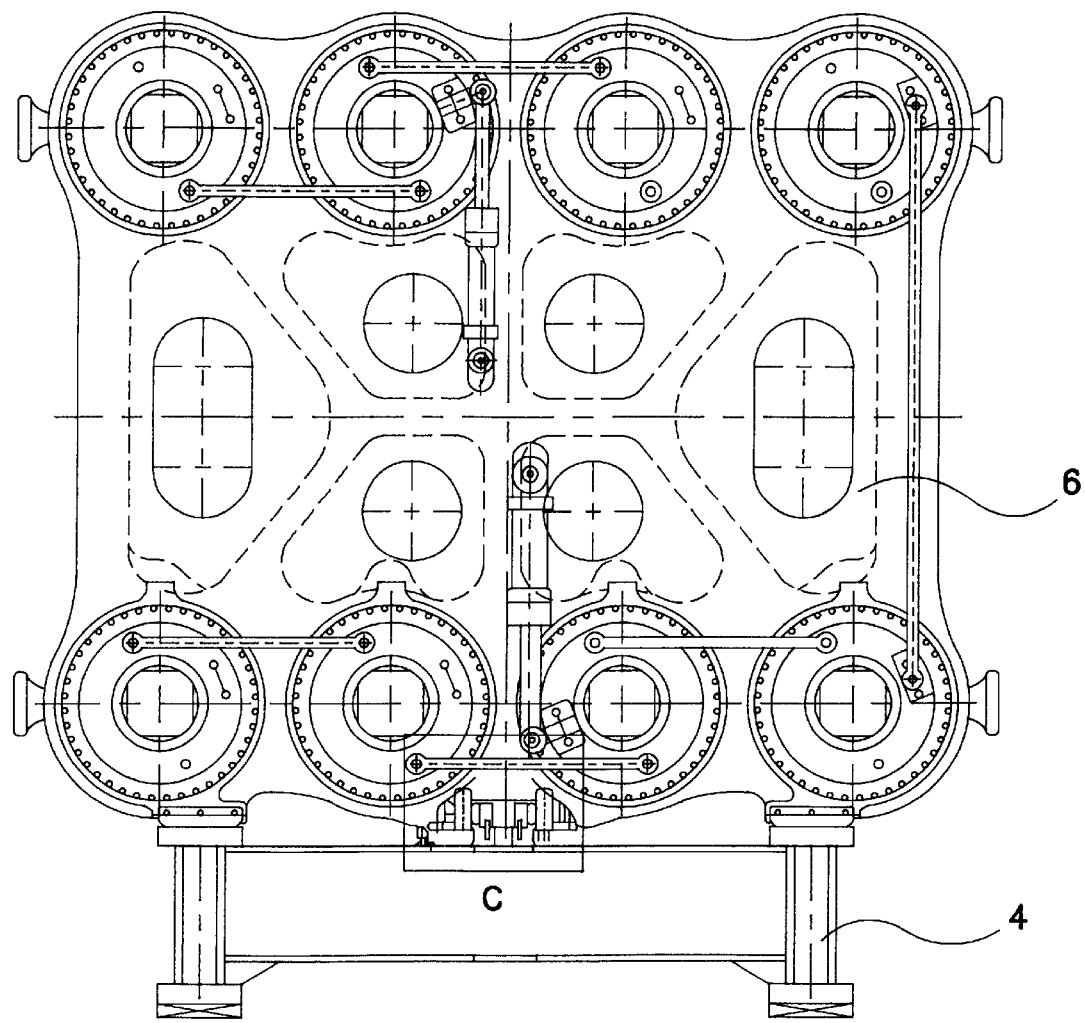
FIG. 4 is a cross sectional view of a moving platen.
Figure 5:
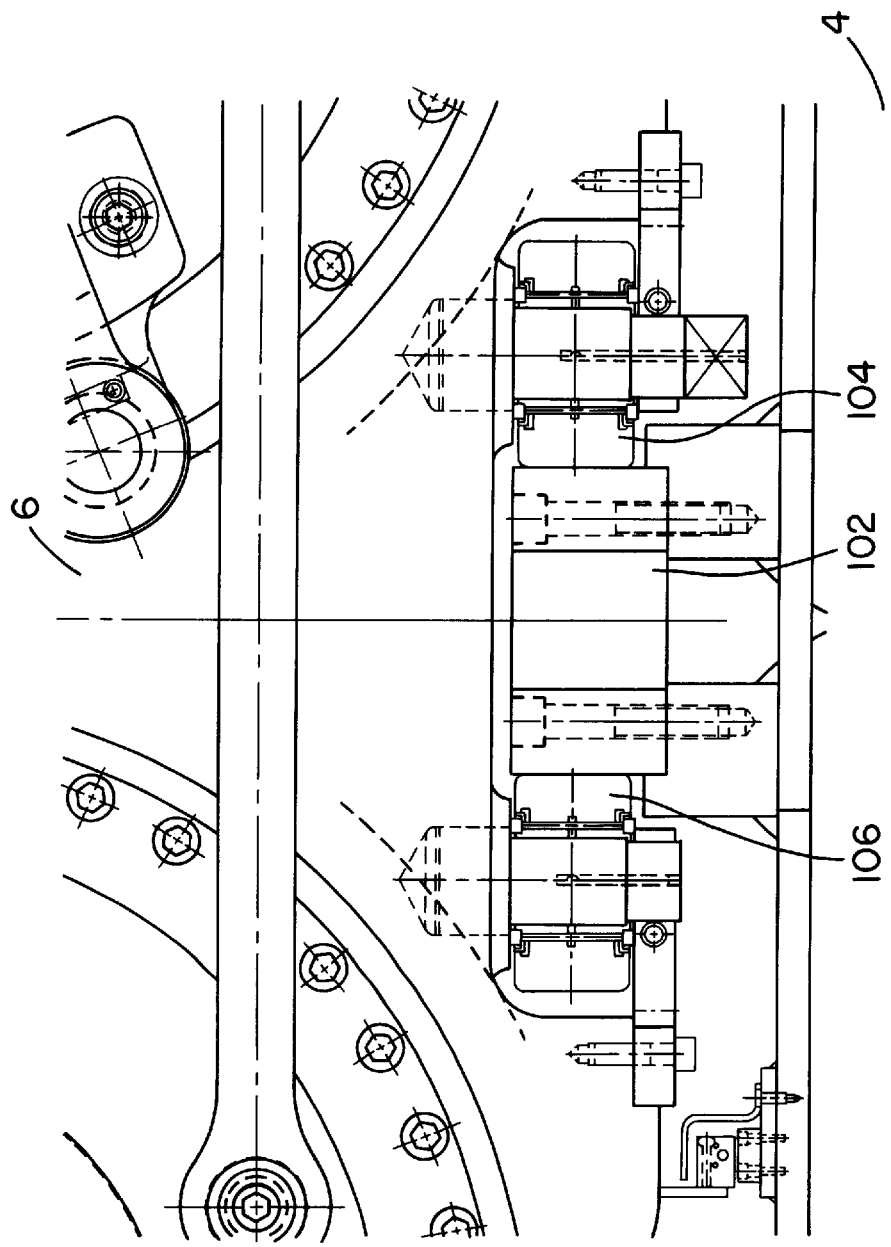
FIG. 5 is an enlarged cross sectional view of box C in FIG. 4, showing guidance means for the moving platen.

FIGS. 4 and 5 show the moving platen guiding means. The guiding means comprises a central alignment beam 102 mounted on the frame 4 and extending along the length of the frame 4. The beam lies orthogonal to surfaces 20 and 60 of the platens 2 and 6. Cam followers 104 and 106 bear on either side of the beam 102 and are mounted to the moving platen 6 to keep the moving platen 6 aligned as it moves toward and away from the stationary platen 2.

Figure 6:
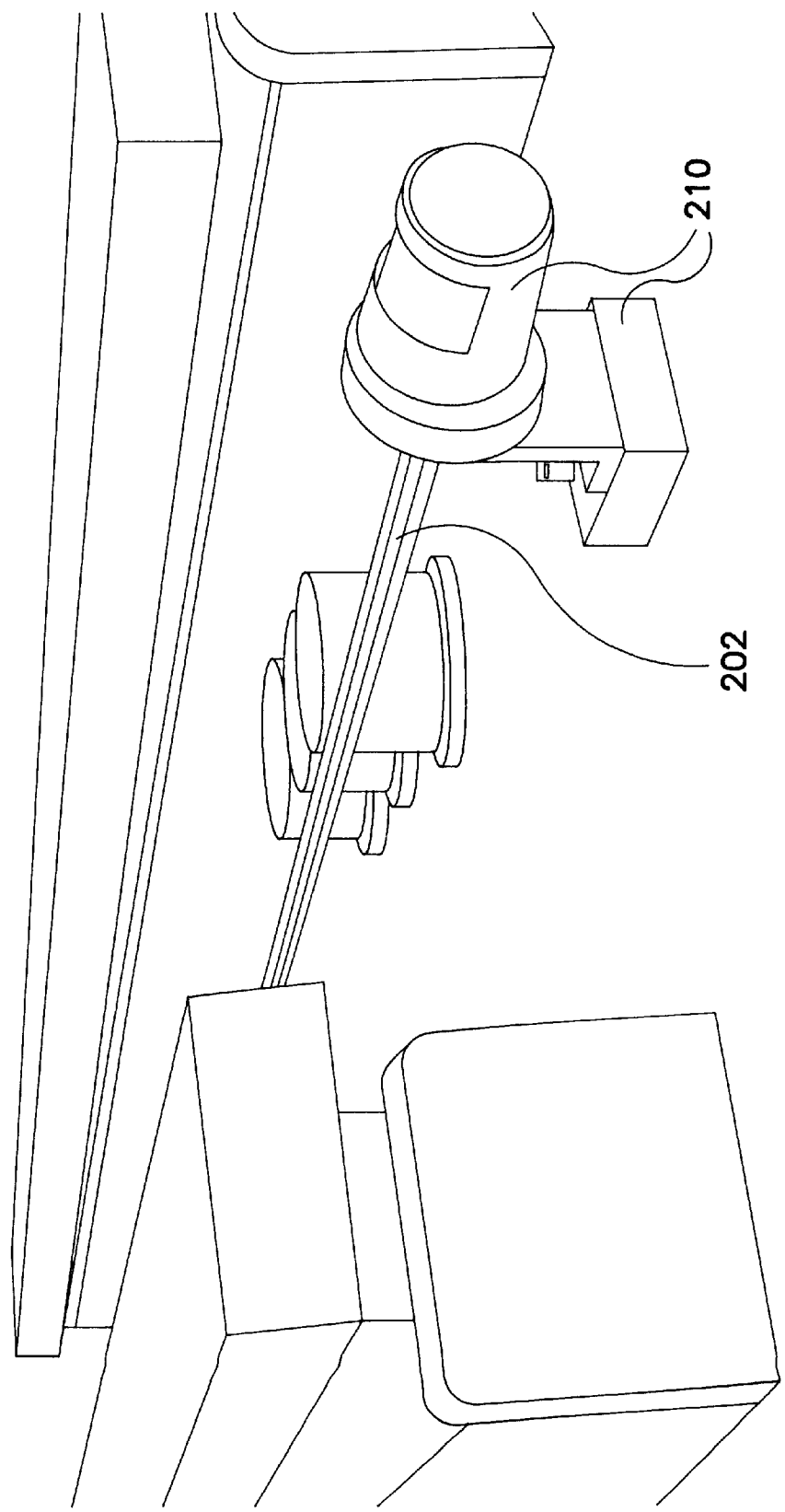
FIG. 6 is a perspective view of a Temposonic position sensor.
Figure 7:
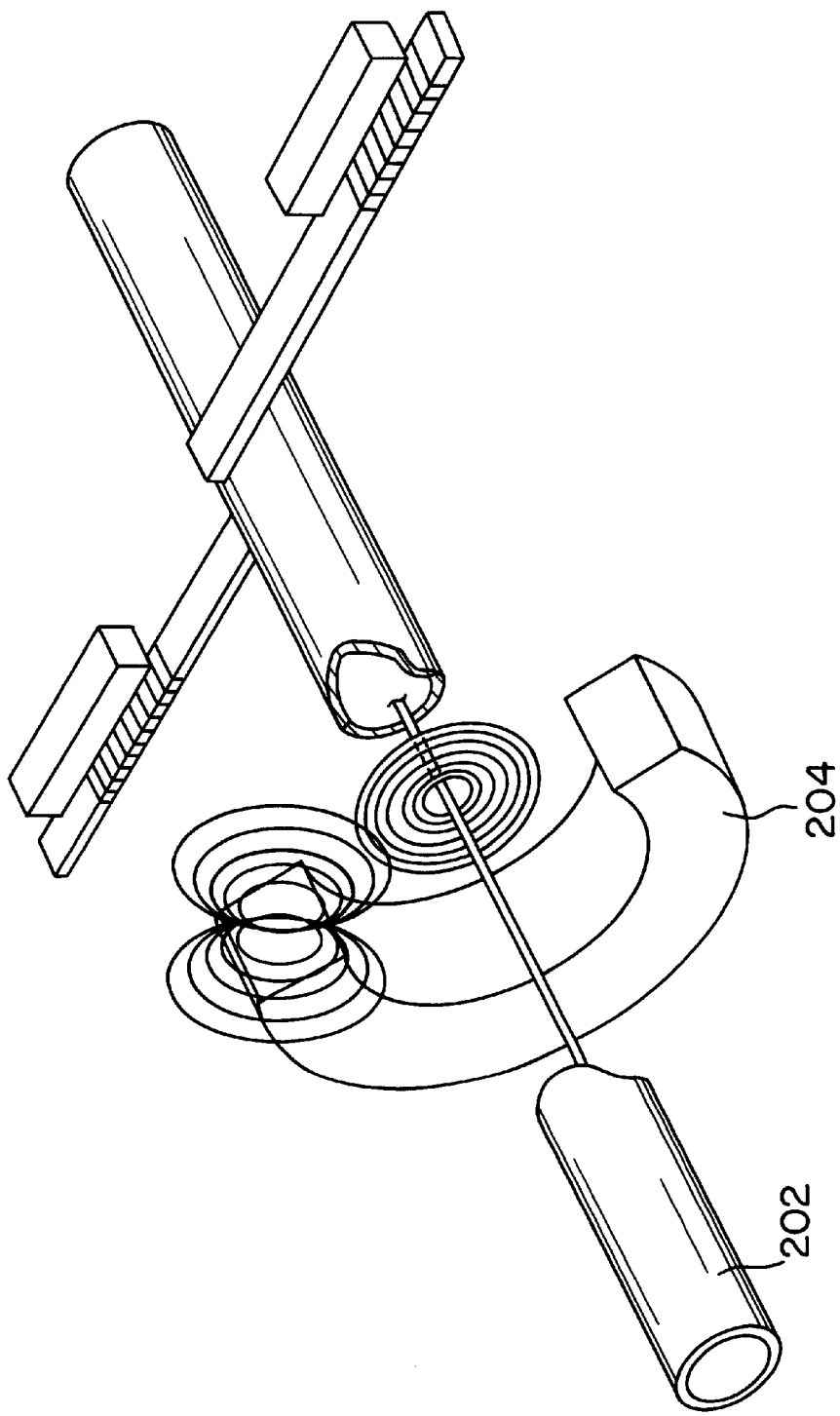
FIG. 7 is an exploded perspective view of a Temposonic position sensor.
Figure 8:
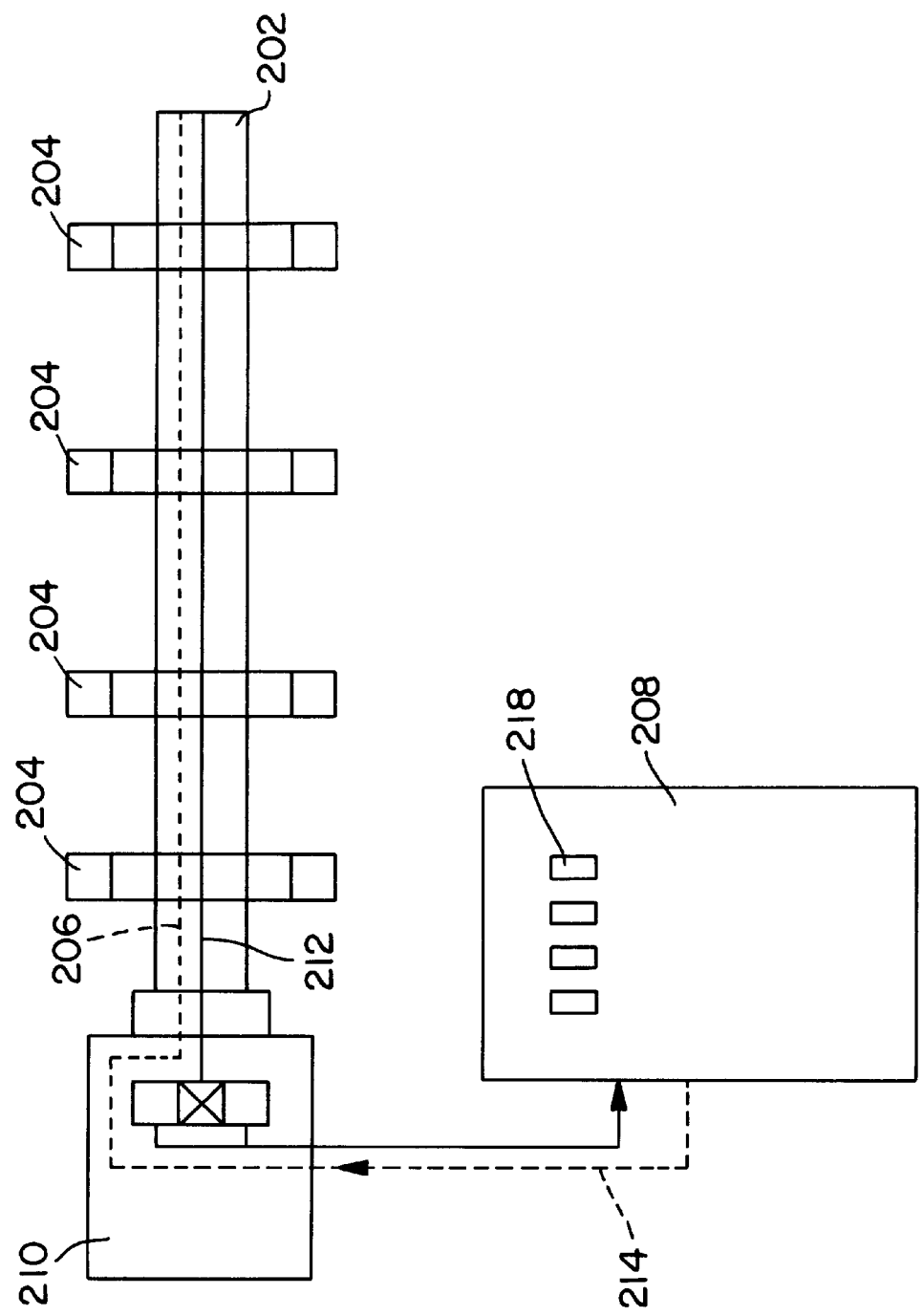
FIG. 8 is a schematic diagram showing the operation of a Temposonic position sensor.

FIGS. 6, 7, and 8 show details of a position sensor means, sold under the brand name Temposonic. The device comprises a transducer rod 202 surrounded by a magnet 204 mounted on the moving element being measured. The magnet 204 induces a field in the rod 202 which contains an alloy wire "exciter" 206 that runs along the length of the rod 202. The system is controlled by a "CPM" [Control Position Module] card 208 located in the machine's control system (not shown). The card 208 emits an electromagnetic interrogation impulse 214 that is transmitted to the rod 202. Each time an interrogation pulse is emitted, or turned on, a timer 218 on the CPM card 208 starts. The interrogation signal 214 travels to a transducer head 210, where it is conditioned and sent along the exciter wire 206 within the rod 202. The interrogation signal 214 causes an electromagnetic field to build up around the rod 202 and a return signal 216 is sent back from the magnet 204 that surrounds the rod 202. The return signal 216 is transmitted on a wave guide 212, inside rod 202, back through the transducer head 210 to CPM card 208. The return signal 216 causes the timer 218 to stop. Based on the time elapsed between emission and return, the distance that the magnet 204 is located from the end of the transducer head 210 can be calculated. Operated in this way, the system can accurately measure the absolute position of the magnet 204 at any given time and determine also the speed of and direction in which the magnet 204 is moving. The system typically can measure position to an accuracy of +/−0.1 millimeters (0.004 inches). It is also possible to use multiple magnets on the same rod, but this feature is not required for this embodiment of the present invention.

Figure 9:
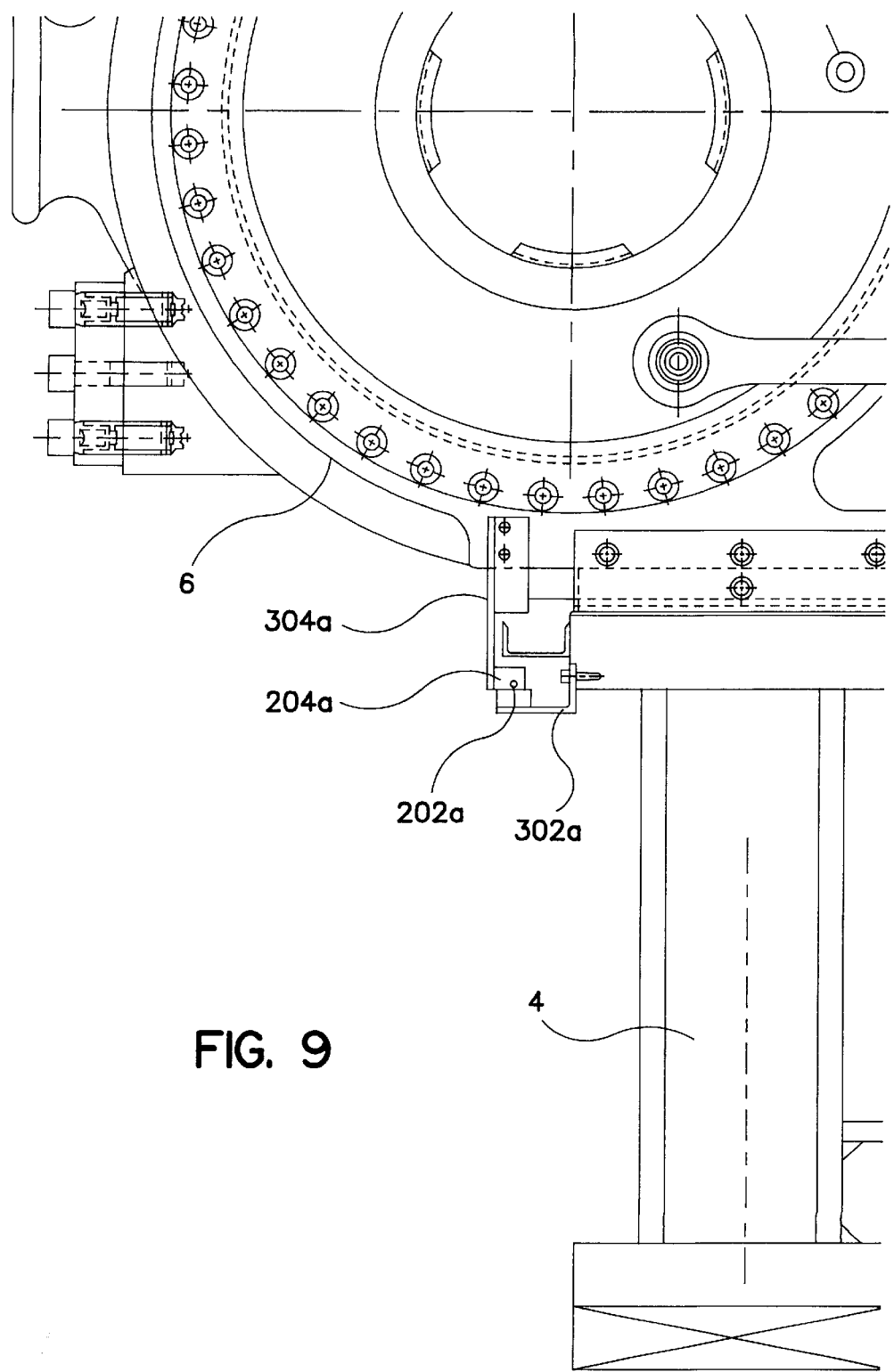
FIG. 9 is an enlarged cross sectional view of box A in FIG. 3, showing the installation of a Temposonic position sensor on the operators side of the large tonnage clamp
Figure 10:
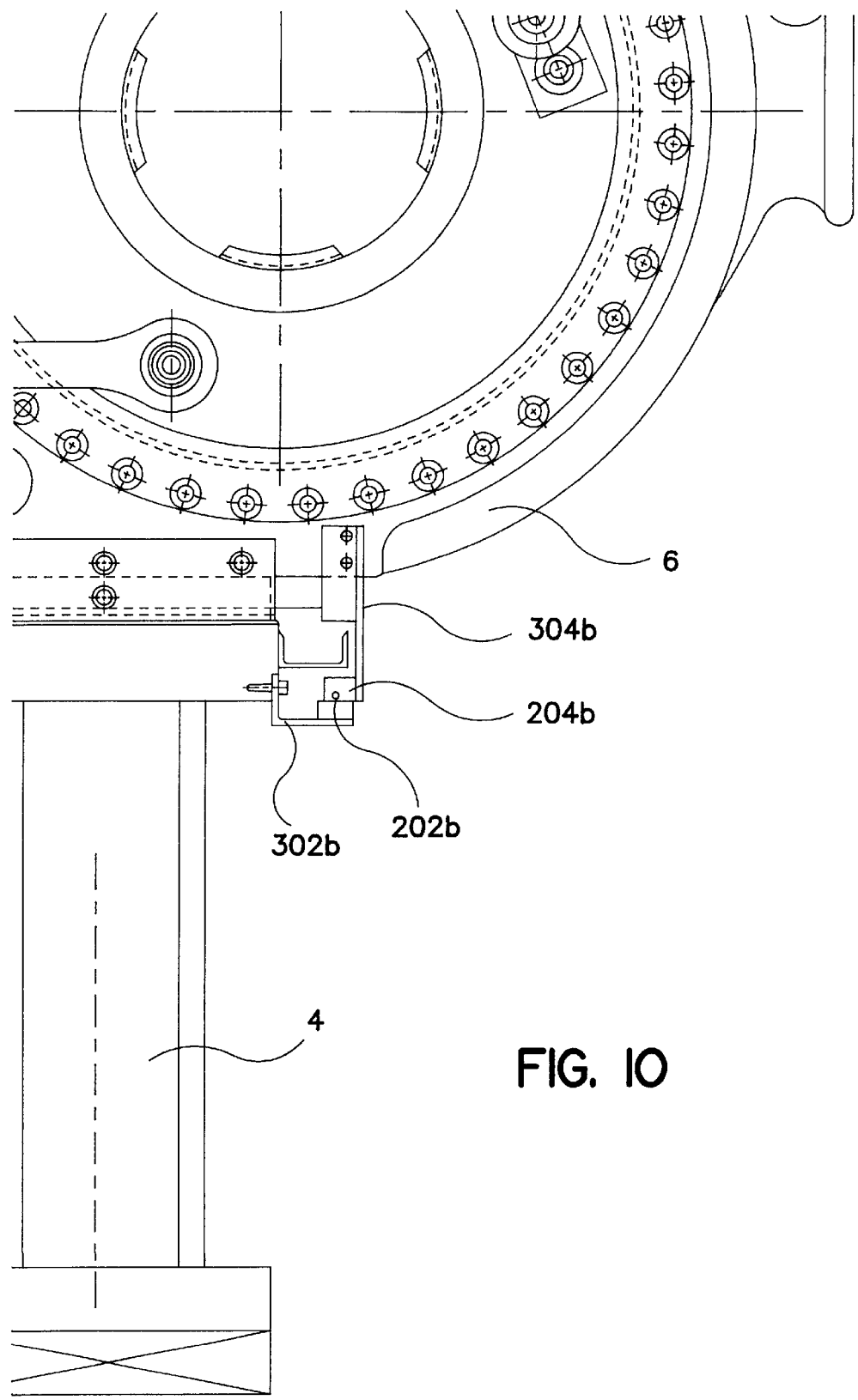
FIG. 10 is an enlarged cross sectional view of box B in FIG. 3, showing the installation of a Temposonic position sensor on the non-operators side of the large tonnage clamp.

FIGS. 9 and 10 show the preferred locations of two transducer rods 202a and 202b and two magnets 204a and 204b on the clamp. In FIG. 9, which illustrates the operator's side of the clamp, the transducer rod 202a is attached by a bracket 302a to the frame 4 or, alternatively, to any other stationary member such as the stationary platen 2. The magnet 204a is attached by a bracket 304a to the moving platen 6. A similar installation is shown in FIG. 10 for the non-operator's side of the clamp. In FIG. 10, the transducer rod 202b is attached by a bracket 302b to the frame 4. The magnet 204b is attached by a bracket 304b to the opposite edge of the moving platen 6 as magnet 204a. Accordingly, there are duplicate installations of Temposonic sensors on each side of the moving platen 6, spaced approximately 5.2 meters (17 feet) apart.

Figure 11:
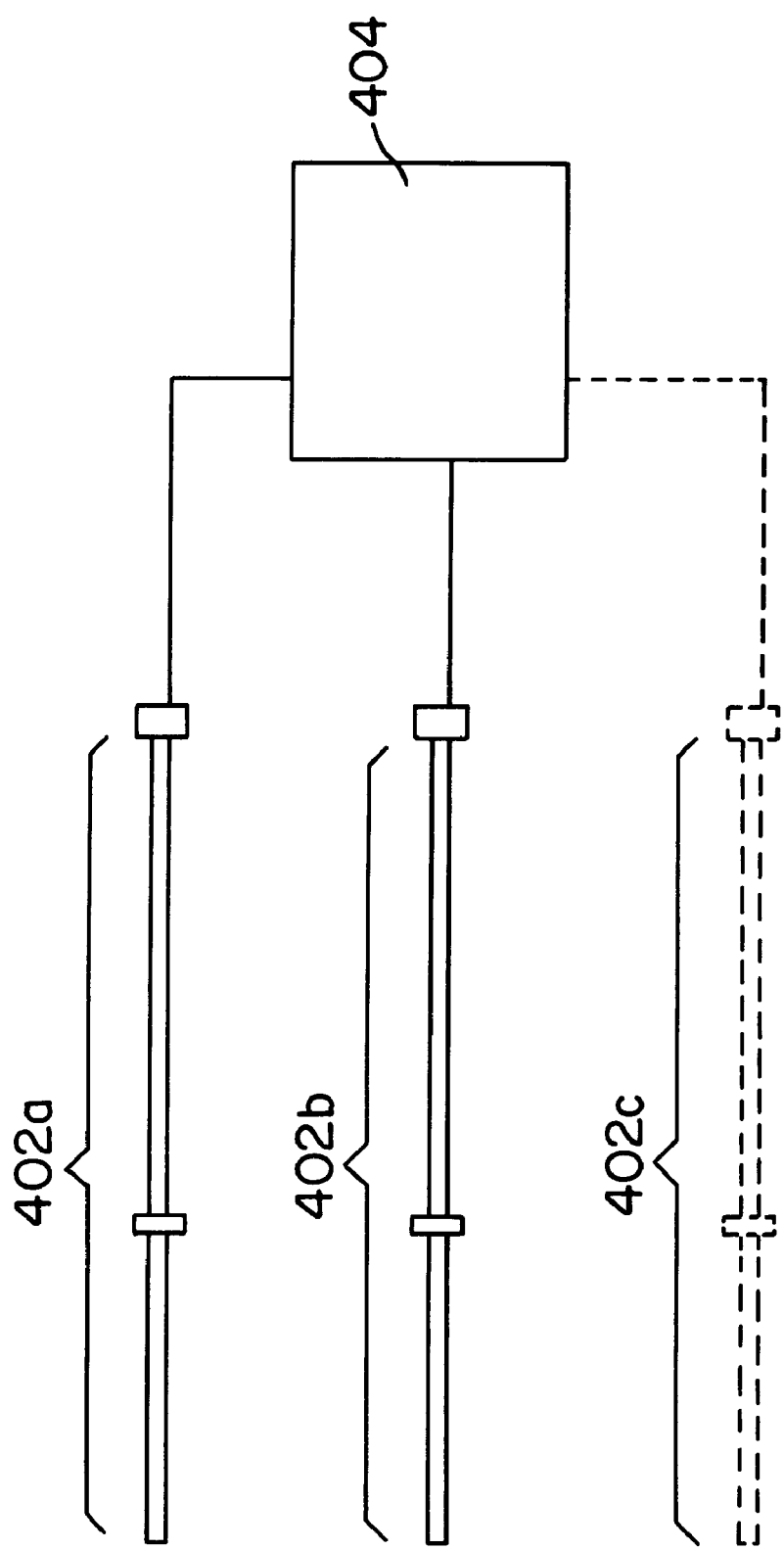
FIG. 11 is a schematic diagram showing the installation of multiple Temposonic position sensors.

FIG. 11 illustrates the control configuration for the dual Temposonic installation. The position and speed signals from the two sensors 402a and 402b are fed to a controller 404 that compares their values on a common time base. Thus, both position and speed of the two opposite sides, or edges, of the moving platen are measured and compared to each other. If the positions and speeds do not substantially coincide, then the platens are either no longer parallel or are about to become skewed.

One sensor, say 402a, is designated the "master" sensor. The other sensor, in this example 402b, is the "slave" sensor. If the signal from the slave sensor 402b is detected to be out of synchronization with the corresponding signal from the master sensor by a predetermined amount with respect to either speed or position, an alarm is signaled to the machine's control system causing movement of the moving platen 6 to be halted. The predetermined amount for signaling the alarm is limited solely by the accuracy of the sensor device, namely 0.1 millimeters. In accordance with the configuration shown in FIG. 11, the actual alignment of the moving platen 6 can be accurately monitored over its entire stroke by the dual sensing system. It is important to be able to sense a misalignment problem over the entire stroke because misalignment may occur at any point during platen movement, as indicated in the examples set forth above.

Another advantageous feature of the present invention allows one or both of the Temposonic sensors to be disconnected temporarily if one or both of the sensors should malfunction. Although disabling one or both of the sensors would prevent the detection of platen misalignment, the machine otherwise would remain fully operational. Repair of the defective sensor could be delayed until a convenient planned downtime, thereby avoiding costly loss of production opportunities. Once repairs are completed, the sensors can be enabled once again for optimal operation of the machine.

Various modifications of the above-described preferred embodiment could be made within the scope of the present invention. For instance, the stationary platen need not be mounted directly to the frame of the machine. Indeed, the stationary platen need not be stationary at all; rather, both platens could be movable and both could be equipped with Temposonic sensors.

As another example, in a preferred embodiment, the moving platen is actuated by a pair of diagonally mounted cylinders. It could just as well be actuated by any suitable means including, but not limited to, pistons, mechanical toggle mechanism or screw actuated drive.

Although the present invention heretofore has been described as having two Temposonic sensors installed on opposite sides of the platens, the placement of the sensors could be varied without departing from the spirit of the present invention. For example, the sensors easily could be positioned at the top and bottom of the platens, or both could be positioned closer to the central alignment beam, although in the latter configuration, sensitivity would be reduced.

Likewise, in a preferred embodiment, the transducer rods are mounted to the frame and the magnets are mounted to the moving platen. A reverse configuration would work equally as well, with the transducer rods mounted to the moving platen and the magnets mounted to the frame.

Finally, as shown in FIGS. 3 and 11, an optional third Temposonic sensor 402c could be installed on top of the platens to detect tipping of the moving platen during movement or clamping. This additional information could be useful in situations demanding very precise parallelism of the platens. Depending on the preciseness desired, any multiple number of Temposonic sensors could be positioned at various strategic locations on the machine.

While the present invention has been described with respect to what are presently considered to be the preferred embodiments, it is understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

We claim:

1. A clamp apparatus, comprising:

a frame;

a first platen having a surface orthogonal to a predetermined axis;

a second platen having a surface opposing the first platen, the second platen being reciprocatable along the predetermined axis;

means for reciprocating the second platen along the predetermined axis between an open and a closed position; and means for detecting positions of a plurality of points on the surface of the second platen during movement of said second platen between the open and closed position, wherein said detecting means comprises an electromagnetic detecting means including a plurality of transducer rods and a plurality of magnets.

2. An apparatus according to claim 1, wherein each magnet is disposed adjacent a transducer rod and is fixed relative to a corresponding one of the plurality of points on the surface of said second platen, each transducer rod being fixed relative to said frame.

3. An apparatus according to claim 1, wherein each magnet is disposed adjacent a transducer rod and is fixed relative to said frame, each transducer rod being fixed relative to a corresponding one of the plurality of points on the surface of said second platen.

4. An apparatus according to claim 2, wherein a plurality of magnets are disposed adjacent each transducer rod.

5. An apparatus according to claim 3, wherein a plurality of magnets are disposed adjacent each transducer rod.

6. An apparatus according to claim 1,
wherein at least two of the plurality of points are located near opposite sides of the surface of said second platen.

7. A clamp apparatus, comprising:
a frame;
a first platen having a surface orthogonal to a predetermined axis;
a second platen having a surface opposing the first platen, the second platen being reciprocatable along the predetermined axis;
means for reciprocating the second platen along the predetermined axis between an open and a closed position;
means for detecting positions of a plurality of points on the surface of the second platen during movement of said second platen between the open and closed position;
means for analyzing the detected positions of the plurality of points; and
means for halting movement of said second platen when said analyzing means determines that the surface of said second platen is not parallel to the opposing surface of said first platen.

8. An apparatus according to claim 1,
wherein said detecting means is adapted to be enabled and disabled.

9. An apparatus according to claim 1,
wherein said detecting means detects a velocity at which each of the plurality of points is moving.

10. A mold clamp for a molding machine, comprising:
a frame;
a first platen mounted on said frame, said first platen having a surface with first and second opposite edges;
a second platen movable toward and away from said first platen, said second platen having a surface facing the surface of said first platen with first and second opposite edges corresponding to the first and second opposite edges of the surface of said first platen;
an actuating mechanism for moving said second platen toward and away from said first platen between an open and a closed position; and
a plurality of sensors for electromagnetically detecting respective positions of the first and second opposite edges of said second platen throughout reciprocal movement of said second platen between the open and closed position.

11. A mold clamp according to claim 10, wherein each sensor comprises a transducer rod fixed relative to said first platen and a magnet fixed relative to said second platen.

12. A mold clamp according to claim 10, wherein each sensor comprises a transducer rod fixed relative to said second platen and a magnet fixed relative to said first platen.

13. A mold clamp according to claim 10, further comprising a controller for analyzing the respective detected positions of the first and second opposite edges of said second platen, and for halting movement of said second platen when a distance from the first edge of said second platen to the first edge of said first platen does not coincide with a distance from the second edge of said second platen to the second edge of said first platen.

14. A mold clamp for a molding machine, comprising:
a frame having a central alignment beam;
a first platen mounted on said frame and disposed perpendicular to the central alignment beam;
a second platen bearing on the central alignment beam;
a plurality of actuating cylinders for reciprocating said second platen along the central alignment beam between an open and a closed position;
a plurality of transducer rods mounted on said frame on opposite sides of the central alignment beam and extending parallel to the central alignment beam;
a plurality of magnets mounted on said second platen, each magnet being disposed adjacent a transducer rod; and
a controller for receiving a plurality of signals indicating a position of each magnet along a respective transducer rod during movement of said second platen between the open and closed position, and determining based on the plurality of signals whether said second platen is parallel to said first platen.

15. A mold clamp according to claim 14, further comprising a plurality of sensors for detecting positions of said plurality of magnets, and for providing the plurality of signals to said controller.

16. A mold clamp according to claim 14, wherein each magnet is mounted on said second platen on opposite sides of the central alignment beam.

17. A mold clamp for a molding machine, comprising:
a frame;
a first platen fixed relative to said frame;
a second platen reciprocatable along a predetermined axis which lies perpendicular to said first platen, said second platen having a surface opposing a surface of said first platen;
an actuating mechanism for reciprocating said second platen along the predetermined axis between an opened and closed position;
means for continuously electromagnetically detecting positions and velocities of a plurality of points on the surface of said second platen during reciprocal movement of said second platen between the open and closed position;
means for analyzing the detected positions and velocities of the plurality of points; and
means for halting movement of said second platen when said analyzing means determines that the surface of said second platen is not parallel to the opposing surface of said first platen.

18. A clamp apparatus, comprising:
a frame;
a first platen fixed relative to said frame;
a second platen movable along a predetermined axis;
an actuating mechanism for moving said second platen along the predetermined axis between an open and a closed position; and
an electromagnetic sensor device for automatically detecting whether opposing surfaces of said second platen and said first platen are parallel during reciprocal movement of said second platen between the open and closed position, said electromagnetic sensor including a plurality of transducer rods and a plurality of magnets.

19. An apparatus according to claim 18, further comprising a controller for halting movement of said second platen when it is determined that the opposing surfaces of said second platen and said first platen are not parallel.

20. An apparatus according to claim 19, wherein said electromagnetic sensor device and said controller can be enabled and disabled.

21. An apparatus according to claim 18, wherein said electromagnetic sensor comprises a plurality of transducer rods with at least one magnet disposed adjacent to each transducer rod.

22. An apparatus according to claim 18, wherein said electromagnetic sensor can continuously detect whether the opposing surfaces of said second platen and said first platen are parallel during movement of said second platen along the predetermined axis.

23. A clamp apparatus, comprising:
   a frame;
   a first platen mounted to said frame;
   a second platen bearing on said frame and movable toward and away from said first platen;
   an actuating mechanism for moving said second platen toward and away from said first platen, the moving of said second platen toward and away from said first platen defining an operational stroke of said second platen;
   a sensor system for continuously detecting whether opposing surfaces of said second platen and said first platen are parallel during the operational stroke of said second platen;
   means for analyzing the detected positions of the opposing surfaces of said second platen and said first platen; and
   means for halting movement of said second platen when said analyzing means determines that the surface of said second platen is not parallel to the opposing surface of said first platen.

24. A control apparatus for use with a mold clamp for a molding machine having a frame, a first platen, a second platen, and an actuating mechanism for moving the second platen toward and away from the first platen between an open and a closed position, the control apparatus comprising:
   a sensor device for continuously determining whether opposing surfaces of the first and second platens are parallel during the entire movement of the second platen between the open and the closed position.

25. An apparatus according to claim 24, wherein said sensor device comprises an electromagnetic device.

26. An apparatus according to claim 24, wherein said sensor device comprises a plurality of transducer rods and magnets.

27. An apparatus according to claim 24, further comprising means for halting movement of the second platen when it is determined that the opposing surfaces of the first and second platens are not parallel.

28. An injection molding machine, comprising:
   a machine frame;
   a first platen;
   a second platen;
   means for moving said second platen between an open and a closed position;
   a first mold half fastened to said first platen;
   a second mold half fastened to said second platen in a manner such that when said second platen is moved to the closed position, said first and second mold halves together form a mold cavity;
   means for injecting molten resin into the mold cavity formed by said first and second mold halves; and
   means for continuously detecting whether said first platen is parallel to said second platen during the entire movement of said second platen between the open and closed positions.

29. An injection molding machine according to claim 28, wherein said detecting means comprises a plurality of transducer rods and a plurality of magnets.

30. An apparatus according to claim 1, wherein the closed position is a mold-fully-closed position, the mold-fully-closed position allowing for a molding of a product, and the open position is a mold-fully-open position, the mold-fully-open position being a position of said second platen along the predetermined axis allowing for an extraction of the product.

31. An apparatus according to claim 2, further comprising a central alignment beam mounted on said frame, said central alignment beam being positioned parallel to the predetermined axis, wherein said second platen having a supporting edge is movably mounted on said central alignment beam so that the supporting edge is in slidable contact with said central alignment beam and said frame.

32. An apparatus according to claim 31, further comprising bearing means for guiding said second platen during movement along said central alignment beam, said bearing means bearing on an at least one side of said central alignment beam and said bearing means being mounted to said second platen.

33. An apparatus according to claim 32, wherein said reciprocating means is at least one set of symmetrically opposed cylinders.

34. An apparatus according to claim 32, wherein each magnet surrounds one transducer rod.

35. An apparatus according to claim 32, wherein said detecting means detects positions of the plurality of points with an accuracy of 0.004 inches.

36. An apparatus according to claim 32, wherein the closed position is a mold-fully-closed position, the mold-fully-closed position allowing for a molding of a product, and the open position is a mold-fully-open position, the mold-fully-open position being a position of said second platen along the predetermined axis allowing for an extraction of the product.

37. An apparatus according to claim 36, wherein said electromagnetic detecting means automatically and continuously detects the positions of the plurality of points on the surface of said second platen during reciprocal movement of said second platen between the mold-fully-open position and the mold-fully-closed position.

38. An apparatus according to claim 28, wherein said means for moving said second platen exerts at least 8000 metric tons of a clamping force on said first and second mold halves.

* * * * *